United States Patent [19]

Hwang

[11] Patent Number: 5,530,892
[45] Date of Patent: Jun. 25, 1996

[54] SINGLE CHASSIS MULTIPLE COMPUTER SYSTEM HAVING SEPARATE DISPLAYS AND KEYBOARDS WITH CROSS INTERCONNECT SWITCHING FOR WORK GROUP COORDINATOR

[75] Inventor: Ivan C. Hwang, Santa Ana, Calif.

[73] Assignee: HT Research, Inc., Tustin, Calif.

[21] Appl. No.: 522,835

[22] Filed: Sep. 1, 1995

Related U.S. Application Data

[63] Continuation of Ser. No. 33,160, Mar. 16, 1993, abandoned.

[51] Int. Cl.$^6$ ........................................................ G06F 3/00
[52] U.S. Cl. .......................... 395/822; 395/821; 395/800; 345/168; 364/234; 364/237.2; 364/DIG. 1
[58] Field of Search ................................. 395/200, 275, 395/800, 822, 821; 345/1, 168

[56] References Cited

U.S. PATENT DOCUMENTS

| | | | |
|---|---|---|---|
| 4,128,876 | 12/1978 | Ames et al. | 364/200 |
| 4,313,161 | 6/1982 | Hardin et al. | 364/200 |
| 4,641,262 | 2/1987 | Bryan et al. | 364/900 |
| 4,897,801 | 1/1990 | Kazama et al. | 345/168 |
| 4,965,560 | 10/1990 | Riley | 345/1 |
| 5,251,320 | 10/1993 | Kuzawinski et al. | 395/750 |
| 5,263,171 | 11/1993 | Asprey | 395/800 |

*Primary Examiner*—Christopher B. Shin
*Attorney, Agent, or Firm*—Leonard Tachner

[57] ABSTRACT

A multiple computer system having team/work group features built in. A principal hardware component thereof is a unitary chassis of a compact tower configuration, designed to house electronics for up to four personal computers, all operating on a single power supply. The unitary chassis provides interconnecting cable for connecting up to four corresponding display terminals and keyboards. One of the personal computers in the chassis is designated the TEAM-HUB and the remaining personal computers in the chassis are designated TEAMMATES. Up to three such additional computers called TEAMMATES may be included in one such chassis. Two TEAMPRO systems may be readily combined to serve up to eight local users in a team/work group environment. Each such computer electronics within the TEAMCHASSIS provides a communication card, which may for example be a SCSI card providing data rate transfer between TEAMHUB and TEAMMATES at 10 Megabytes per second. Furthermore, within the TEAMCHASSIS, each computer comprises a CPU card and a monitor interface card, such as a VGA card. The present invention also provides what is referred to hereinafter as a "teampanel" which is a stand-alone system monitoring unit that is typically located near the teamchassis and provides switchability between the TEAMHUB and any selected TEAMMATE computer.

4 Claims, 10 Drawing Sheets

SINGLE CHASSIS MULTIPLE COMPUTER SYSTEM HAVING SEPARATE DISPLAYS AND KEYBOARDS WITH CROSS INTERCONNECT SWITCHING FOR WORK GROUP COORDINATOR

This is a continuation of application Ser. No. 08/033,160 filed on 16 Mar. 1993, now abandoned.

BACKGROUND OF THE INVENTION

1. Field of the Invention

The present invention pertains generally to the field of personal computers and high end work station computers and more specifically to a multiple computer system, wherein a single unitary chassis houses virtually all of the electronics for a plurality of personal computers, the display monitors and keyboards for which can be located at dispersed locations for operation in a teamwork or work group environment with from 2–8 users or in an enterprise wide network environment involving multiple teams or work groups of up to 250 users.

2. Prior Art

The concept of interconnecting a plurality of computers to create: one interactive network for small workgroups, is not per se new. By way of example, there are several different ways to connect a group of say up to eight computers to provide a single team/work group environment with different levels of services. From the simple printers switch box to the loosely coupled peer-to-peer (i.e. devices and applications having) Ethernet-connected workstations, various levels of interactive cooperation are currently available, however all suffer from a variety of disadvantages. For example, a printer sharing device is certainly a temporary and wholly inadequate solution because it provides only one of the many functions that a single team/work group requires. Industry trends show that future DOS-based operating systems will have the peer-to-peer connectivity built in. By that time, if a work group wants to take advantage of a full-fledged peer-to-peer function, they will have to set aside those inefficient hardware switch boxes. In the personal computer area, file exchange packages using a parallel port or a serial port for hooking up at least two personal computers, are useful in some cases, but they cannot provide a single team/work group environment with real-time connectivity. In fact, unless the work group has only two personal computers, that solution is not ideal. The prevailing method of using Ethernet, Token-Ring or the like to connect a group of up to eight desktop personal computers is not without disadvantages as well. Even though this solution provides a single team/work group environment with basic peer-to-peer or client/server functions, it also suffers from a number of disadvantages. By way of example, it provides no adequate security measures to guard against intruders who might illegally copy databases or the contents of confidential working files directly from unprotected media storage devices which also raises the possibility of virus contamination. Multiple personal computer systems of the prior art also fail to provide an efficient way for backing up data in a peer-to-peer environment. Furthermore, in order to protect the entry of data, typically each such PC system connected in a multiple user group configuration requires its own uninterruptible power supply (UPS), as well as its own regular power supply in order to operate. In fact, such prior art interconnected work group PC systems are inefficient in general because of redundancies, not only in power supply and UPS, but also in chassis boxes, floppy drives, wiring hubs and the like. In addition, such prior art multiple PC systems suffer from low data transfer rates, as well as the unpleasant requirement for a large and unwieldy chassis at each user's location. Furthermore, there is no easy way for one user to monitor the displays or keyboard operations of any other user from his or her remote location and accordingly such prior art systems are not conducive to a supervised work group environment, such as for use in a classroom context.

The most common way of connecting conventional PCs, that is up to eight PCs, is to use Ethernet, Token-Ring or the like which provides for peer-to-peer connectivity between each system. However, such a loosely coupled Ethernet or Token-Ring-based multiple PC system is not usually designed to be team or work group oriented and therefore cannot offer those functions that a team or work group oriented system can. In an enterprise network environment, PC networking has become more and more important and indispensable. However, while today's PC networking may have provided all the needed functions, it is not well organized nor well structured and because it lacks a well designed network architecture, it can sometimes be ineffective and inefficient. Current centralized file server networks cannot be combined with work group peer-to-peer networks on only one cabling system because one cabling system cannot accommodate all of the activities without sacrificing performance. Therefore, the concept of networking a large number of personal computers using a loosely coupled plurality of existing personal computers, is also a less than satisfactory concept using conventional prior art systems.

Accordingly, there is still an ongoing need for a more efficient team/work group oriented multiple PC system that can for example, accommodate up to eight users within a relatively small area, such as a typical small business office, retail store, restaurant or professional office environment. Furthermore, it would be desirable for such systems to be useable in enterprise-wide networking applications, wherein a plurality of such systems can accommodate as many as 250 users. Utilizing a work group-based subnet instead of a loosely coupled single PC as the basic enterprise-wide network building block, such networks can be well organized and easy to manage when wherein each node can communicate with other nodes at a high transfer rate within the work group and still access the centralized file server to optimize network productivity to the fullest.

SUMMARY OF THE INVENTION

The present invention solves the aforementioned ongoing need by providing a multiple computer system having team/work group features built in. A principal hardware component of a preferred embodiment of the present invention is a unitary chassis of a compact tower configuration designed to house electronics for up to four personal computers, all operating on a single power supply. The unitary chassis provides interconnecting cables for connecting up to four corresponding display terminals and keyboards. One of the personal computers in the chassis, referred to hereinafter as the "teamchassis", is designated the "TEAMHUB" which may be for example, an Intel Model 386 or a 486-based system. The chassis provides hub-configured slots for the remaining PCs to share software applications, as well as to share hardware devices such as printers, modems, CD-ROMs, tapes, disks, etc. The teamchassis also provides the electronics for three additional computers designated hereinafter "TEAMMATEs" which may also be an Intel Model 386, or a 486-based system that provides the most desirable computing power for the work group. The teamchassis provides slots for various interface electronic cards for all of the four computers, including a communication card for each computer. The communication card, which may for example be a Small Computer System Interface (SCSI) card, provides the highest data transfer rate among TEAMHUB and TEAMMATEs at 10 megabytes per second. The teamchassis also accommodates shared floppy disk drives daisy-chain-connected to all computers. The drives provide an alternative boot up path for each TEAMMATE during setup or when a TEAMMATE's system disk is faulty. They also provide diskless TEAMMATEs with remote boot capability. The TEAMCHASSIS also provides a single, centralized power supply that eliminates any possibility of accidental individual shutoff ensuring reliable work group data communications. An externally connected uninterruptible power supply backup (UPS) provides the TEAMHUB and TEAMMATEs with UPS service, ensuring work group data communication and data recovery whenever the external power is interrupted.

A monitor and keyboard for each individual computer, that is, the TEAMHUB and each of the three TEAMMATEs, are connected to the teamchassis by two cables, a VGA monitor cable and a keyboard cable. The keyboards are specially designed for the system of the present invention. They possess all of the amenities of a regular personal computer keyboard, but they also provide, in addition to regular keyboard functions, a reset button, a built-in speaker buzzer, a system disk LED indicator, and two serial ports for a mouse, serial line printer, hand held scanner, card reader, modem/fax or the like. The present invention also provides what is referred to hereinafter as a "teampanel" which is a stand-alone system monitoring unit that is typically located near the teamchassis and provides switchability between the TEAMHUB and any selected TEAMMATE computer. The teampanel thus provides the most efficient and effective way for project supervision, group coordination, learning and teaching and facilitates work group communication while maximizing the work group productivity. Within the teamchassis, each computer comprises a CPU card, a data communication card such as an SCSI card, and a monitor interface card such as a VGA card. In addition, the teamchassis provides at least one 5¼ inch floppy disk drive and at least one 3½ inch floppy disk drive, both of which can be shared by any of the four computers. In addition, each computer has its own hard disk drives. An optional internal tape backup system and/or an optional CD-ROM are also provided. The system is also designed to connect to external devices, such as another CD-ROM or other SCSI devices commonly known to those familiar with SCSI interconnection systems. Each SCSI card, referred to herein also as the TEAMWORK card, includes a LAN driver designed to run directly with a variety of popular DOS-based client-server and peer-to-peer network operating systems, such as Netware, Novell-Lite, Lantastic and the like.

The overall multiple computer system of the present invention, hereinafter referred to as "TEAMPRO", can be configured to have only one computer to start with and gradually be increased in the number of computers up to eight with significant cost savings. Multiple TEAMPRO work group computer systems can also be easily linked by wireless, Ethernet, or Token-Ring and the like, producing the most ideal enterprise-wide network. TEAMPRO can easily be hooked up with any existing personal computers by using a teamwork card including direct hookup with SUN and DEC workstations, providing an instant work group data communication capability. When hooked up to an enterprise-wide network, the TEAMHUB or TEAMMATE computers can instantly become a network node and expand the network connectivity effortlessly without reconstructing the cumbersome existing network cabling. TEAMPRO provides easy and direct hookup with personal portables through Ethernet, wireless, parallel, or enhanced parallel port and the like. In an enterprise-wide network environment, TEAMPRO can serve as a network bridge for portables, such as for laptop and notebook computers, creating a better network architecture to organize and manage network activities.

OBJECTS OF THE INVENTION

It is therefore a principal object of the present invention to provide a PC-based, local area network computer system in which a single chassis is used to house electronics for up to four personal computers.

It is in additional object of the present invention to provide a multiple PC-based TEAMWORK computer system for small areas, such as up to 20,000 square feet, in which a plurality of users at different work station locations therein, each has a monitor and keyboard connected to a central teamchassis, the latter housing the central processing unit for each of the computer work stations.

It is still an additional object of the present invention to provide a multiple PC-based work group computer system comprising a TEAMHUB computer and a plurality of TEAMMATE computers and further comprising a teampanel to allow the TEAMHUB user to switch the monitor display and keyboard operations of any of the TEAMMATE computers into the TEAMHUB for supervision and control.

It is still an additional object of the present invention to provide a PC-based computer system, wherein a single chassis houses the electronics for all of the computers which operate on a single, shared power supply, thereby increasing the operating efficiency of the entire system.

It is still another object of the present invention to provide a multiple computer based system which may be readily adapted for use in either a local work group environment or enterprise-wide network environment, a work group environment providing individual work stations for up to 8 users, and a network environment providing multiple TEAMWORK work group systems with individual work stations for up to 250 users.

It is still an additional object of the present invention to provide a multiple computer system with a centrally located teamchassis, providing high data transfer between the computers, as well as shared power supply, floppy disk drives, CD-ROM and tape backup and other device and application sharing, yielding a significant increase in performance and concurrent reduction in cost.

It is still an additional object of the invention to provide an improved multi-computer, multi-level architecture providing an increased data rate transfer communication work group link to reduce unnecessary network traffic.

It is still an additional object of the invention to provide an improved multi-computer work group system which minimizes interference with the working environment.

It is still an additional object of the invention to provide an improved multi-computer system which provides improved security to prevent unauthorized access and minimize virus contamination.

It is still an additional object of the invention to provide a multi-computer system which can be expanded in selected steps to facilitate user growth and investment.

It is still an additional object of the invention to provide a multi-computer system which can be easily upgraded to accommodate future technology such as improved protocals including fiber optics and the like.

BRIEF DESCRIPTION OF THE DRAWINGS

The aforementioned objects and advantages of the present invention, as well as additional objects and advantages thereof will be more fully understood hereinafter, as a result of a detailed description of a preferred embodiment thereof, when taken in conjunction with the following drawings in which.

DETAILED DESCRIPTION OF PREFERRED EMBODIMENTS

Figure 1:
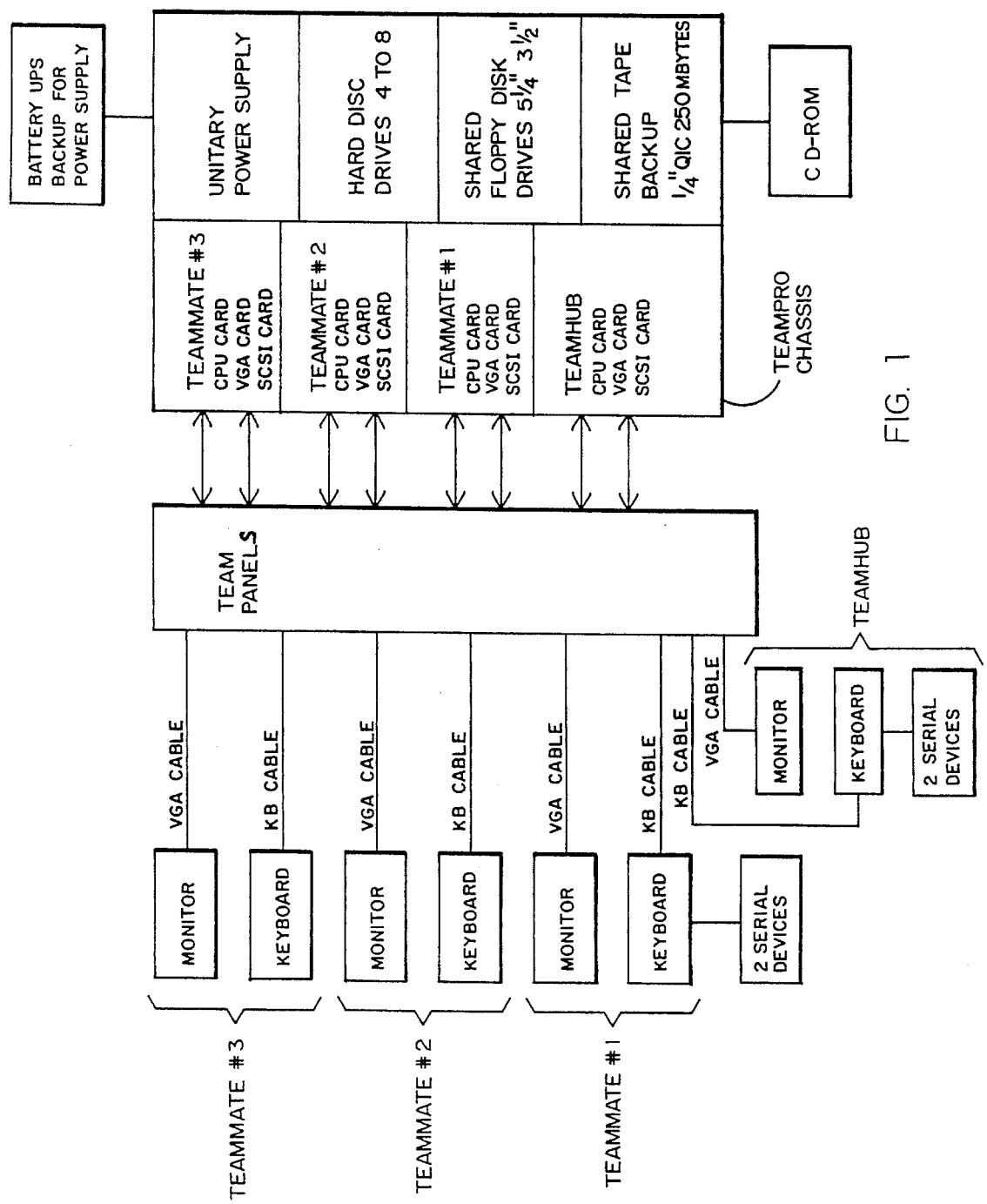
FIG. 1 is a block diagram of a team/work group system for up to four users in accordance with the present invention.

Referring now to FIG. 1, it will be seen that one preferred embodiment of the present invention comprises a TEAMPRO chassis 10 and four sets of monitors 12 and keyboards 14 connected to the chassis through a teampanel. Each individual combination of monitor and keyboard corresponds to one personal computer or PC. One such computer is referred to herein as the TEAMHUB and the remaining such computers are referred to herein as TEAMMATEs. As shown in FIG. 1, there is one TEAMHUB and three TEAMMATEs, namely TEAMMATE 1, TEAMMATE 2 and TEAMMATE 3. Except for the monitor and keyboard for each such computer, all of the electronics for each such computer are contained in the unitary TEAMPRO chassis which comprises a CPU card, VGA card and SCSI card for each of the corresponding monitors and keyboards. Thus, there is such a three card set for the TEAMHUB and such a three card set for each of the TEAMMATEs. The TEAMPRO chassis also comprises a unitary power supply 15 to provide: electrical power for all of the electronics contained within the TEAMPRO chassis. An externally connected battery back-up UPS 16 is also provided as an option. Also housed within the TEAMPRO chassis are from four to eight hard disk drives 18 and two floppy disk drives 20 comprising a 5¼ inch floppy disk drive and a 3½ inch floppy disk drive. Also included in the TEAMPRO chassis is a shared tape back-up 22¼ inch QIC type with 250 megabytes capacity. A compact disc read only memory 24 (CD-ROM) or other SCSI devices may also be internally or externally connected to the TEAMPRO chassis.

There are two lines or cables connected to each TEAMMATE computer electronics and to the TEAMHUB computer electronics that extend externally of the TEAMPRO chassis. One such cable for each computer is the VGA monitor cable 25 and the other such cable for each computer is the keyboard cable 27. All eight of these cables pass through a switching mechanism hereinafter referred to as the "teampanel" 26 the function and operation of which will be more fully disclosed hereinafter. Each VGA cable is connected to a display monitor and each keyboard cable is connected to a corresponding keyboard located adjacent to the corresponding display monitor. Each such monitor and keyboard combination may be spaced from the TEAMPRO chassis by as much as 150 feet in the preferred embodiment. Each keyboard provides an IBM type standard keyboard format with the addition of two serial ports. Consequently, each keyboard cable comprises 26 lines. Four such lines are for keyboard operation, eight lines are for each serial port and there are six control lines, including for example, a speaker line, a hard disk indicator line and a reset line. This 26 line cable is connected to a remote access port in the CPU card corresponding to the TEAMHUB or to one of the TEAMMATEs. The connection to the monitor, by means of a VGA monitor cable, emanates from a VGA card in the computer electronics for each such computer system. The VGA card is also located in the TEAMPRO chassis.

Each CPU card in the TEAMPRO chassis can be any of the following CPUs, 486 DX-50, 486 DX2-50, 486 DX-33, 486 SX-25 and the like. In a typical preferred embodiment of the four computer version of the invention such as that shown in FIG. 1, the TEAMHUB CPU card is a 486DX-50 CPU and each of the TEAMMATE CPU cards comprises a 486SX-25 CPU. Each such CPU card has four megabytes of memory standard, but can have as much as 64 megabytes of memory. In addition, each such CPU card has a built-in disk controller with connections for connecting to one or two hard disk drives. Thus, one or two hard disk drives may be assigned for use with each computer, that is the TEAMHUB and each of the three TEAMMATEs.

One of the advantages of the present invention is that it may be initially obtained with any number of computers from one to four and, if it has initially less than four computers, it may be upgraded at any time to increase the number of computers up to four. Thus for example, the present invention may initially be obtained with only a TEAMHUB computer and later upgraded as need requires to add one, two or three TEAMMATE computers. Within the TEAMPRO chassis, there are two teamslot boards for interconnecting the VGA, CPU and SCSI cards internally. There is one such teamslot board for the TEAMHUB which provides ten slots and a second such teamslot board for all three TEAMMATEs which provides twelve slots. The twelve slot teamslot board for the three TEAMMATE computers provides four slots for each computer, one slot for the CPU card, one slot for the VGA card and one slot for the SCSI card and one extra slot for one optional additional card, such as for example a multimedia card. In the teamslot board for the TEAMHUB computer, there are nine extra slots, two of which are for network sharing and seven of which are for future expansion.

As previously indicated, each keyboard of the present invention provides two serial ports, each such serial port provides direct keyboard connection to any form of serial data operated device, such as a modem, a mouse, a card reader or printer.

The TEAMPANELs comprise a plurality of VGA monitor and keyboard switches, respectively. The TEAMPANELs are normally located adjacent to the TEAMHUB computer so that the TEAMHUB operator, using the TEAMPANEL switches, can display on his monitor any display currently on any of the TEAMMATEs. In addition, the TEAMHUB operator, by using the TEAMPANELs, can assume control over any TEAMMATE keyboard. Thus, the TEAMPANELs of the present invention provide an excellent and highly advantageous means for supervisorial or instructional scenarios as well as built-in computer backup for each TEAMMATE computer.

Figure 2:
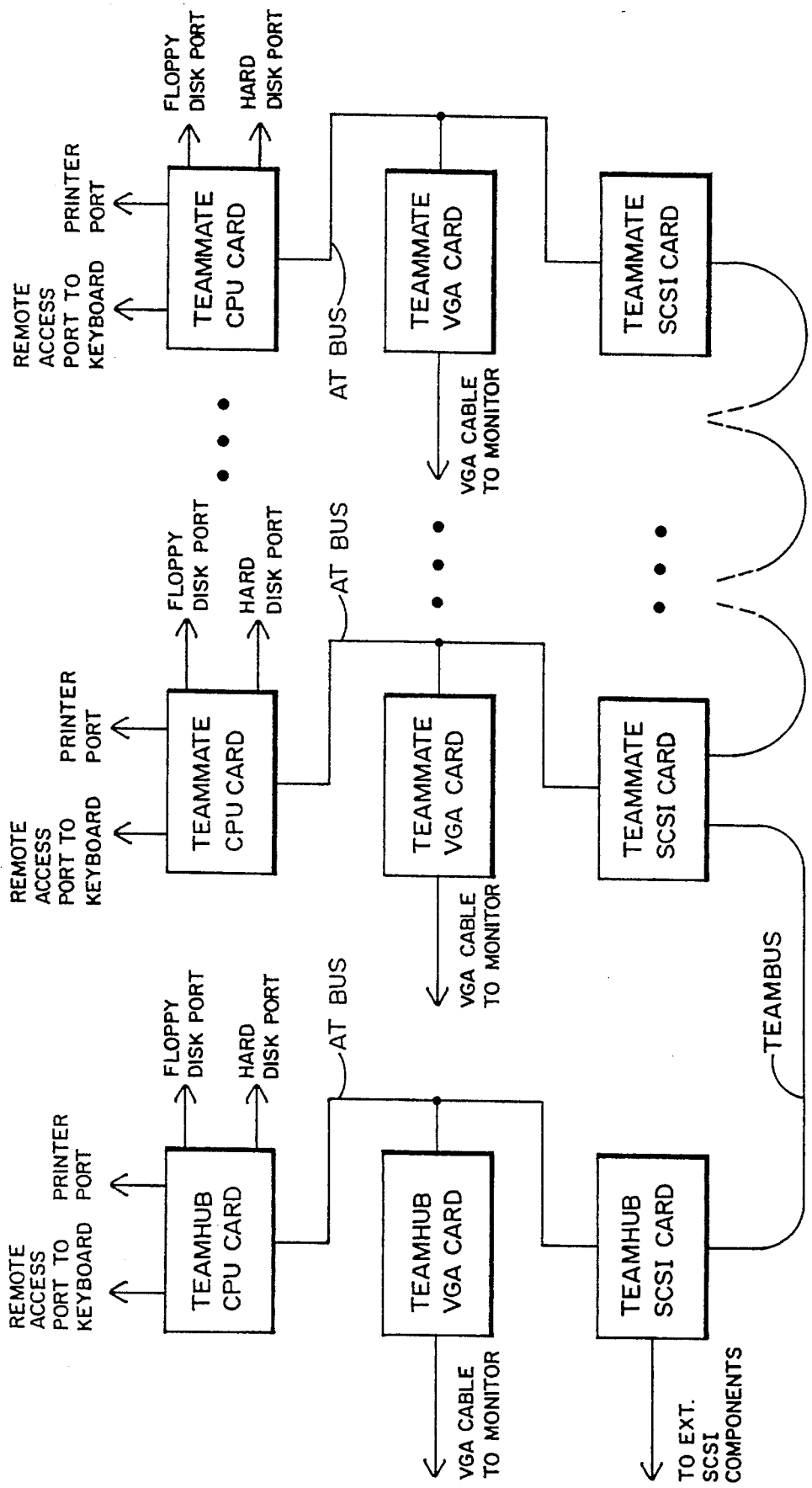
FIG. 2 is a block diagram of the teamchassis used in the present invention.

Referring now to FIG. 2, it will be seen that within the TEAMPRO chassis, each computer comprises a CPU card 30, VGA card 32 and SCSI 34 card which are interconnected by means of the corresponding TEAMSLOT boards. In addition, the various SCSI cards of the respective computers are interconnected in a daisy chain configuration to form an SCSI bus or TEAMBUS for high speed communications between the respective computers. Current SCSI communication data rates are as high as ten megabytes per second which is currently at least eight times faster than Ethernet, the current data communications standard for peer-to-peer work group environments. Furthermore, the SCSI teambus permits external connection of other SCSI devices such as the CD-ROM shown in FIG. 1 or an extremely high capacity SCSI tape backup or hard disk subsystems. Up to four external SCSI devices can be connected by means of the SCSI teambus of the present invention. As seen further in FIG. 2, each computer's CPU card provides a remote access port for connecting the CPU directly to the keyboard, preferably through the TEAMPANELs shown in FIG. 1. Each CPU card also provides a separate printer port thus permitting printers to be connected directly to the TEAMPRO chassis. Each CPU card also provides its own hard disk port and its own floppy disk port. As also seen in FIG. 2, the VGA card of each computer provides a connection by means of a VGA cable to the corresponding monitor.

Figure 3:
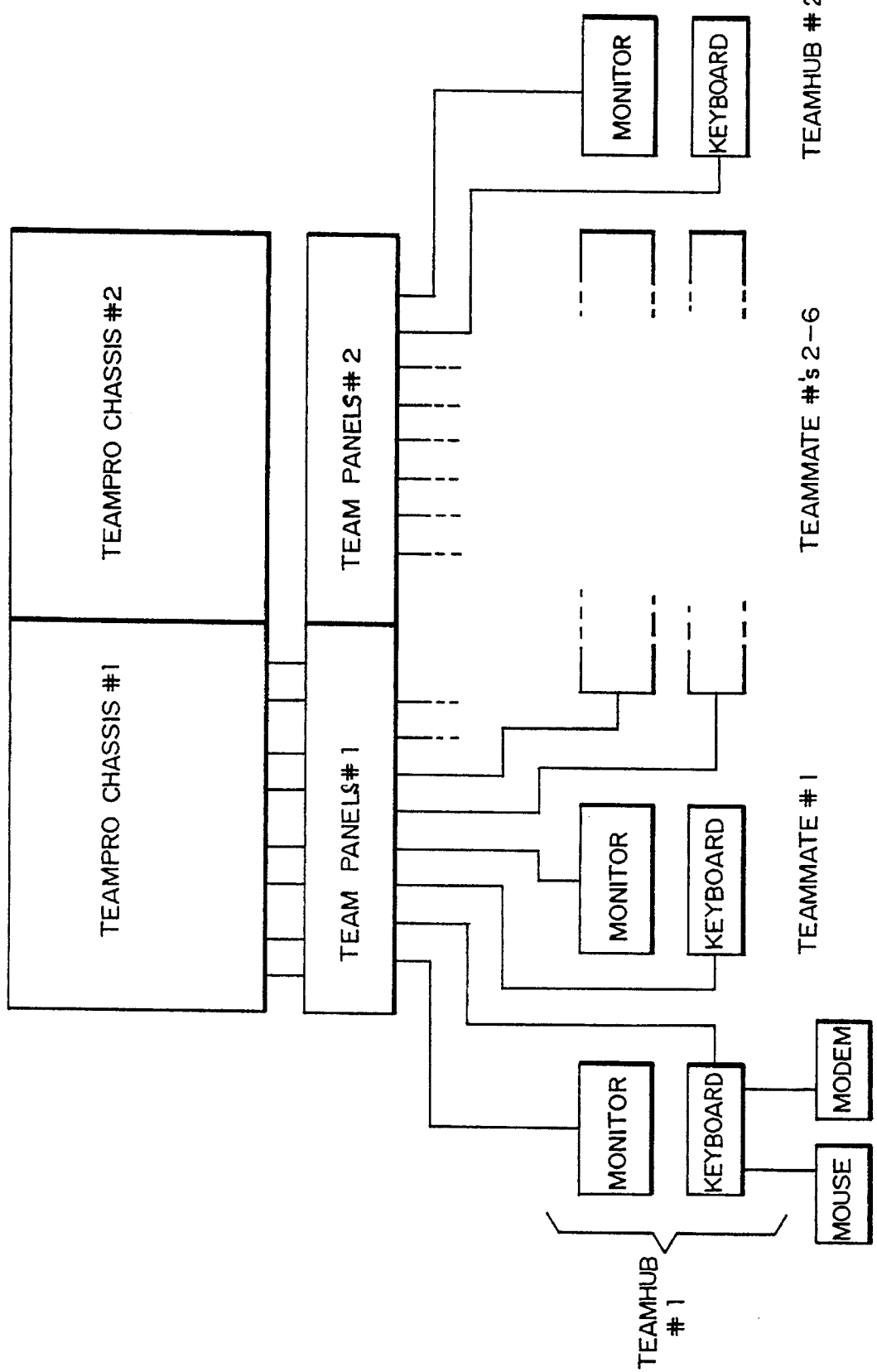
FIG. 3 is a block diagram of a dual chassis configuration of the present invention for use by up to eight users.

The SCSI TEAMBUS of the present invention also permits two separate TEAMPRO chassis 10a and 10b to be interconnected to form an expanded TEAMPRO workgroup system for up to either users. Such a configuration is shown in block diagram form in FIG. 3. In this configuration, two TEAMPRO chassis are electrically interconnected by means of the SCSI teambus, thus providing a system with two TEAMHUB computers and up to six TEAMMATE computers, each having its own corresponding display monitors and keyboard of the type previously described. Each of the computers in the two TEAMPRO system of FIG. 3 may be identical to that already described for the single TEAMPRO configuration of FIG. 1. Thus, in this expanded system of FIG. 3, each CPU card may comprise a 486DX-50 CPU, 486DX2-50 CPU, a 486DX-33 CPU, a 486SX-25 CPU or the like. In addition, the system may be initially obtained with a reduced number of computers and subsequently expanded to a total of eight.

One of the most important considerations faced by systems designers is how to add a diverse selection of peripherals to a microcomputer system without sacrificing speed and performance. The solution currently being implemented by many OEMs is to use the Small Computer Systems Interface (SCSI). SCSI has become virtually a de facto industry standard because it is the only intelligent I/O interface that can be expanded and changed without affecting existing device driver software or interface hardware. SCSI is based on the same architecture as the block-multiplex channel found in large IBM mainframe systems. Because of features such as device independence, high bus bandwidth and an improved bus arbitration. The flexibility and power of SCSI is suited to today's powerful microcomputers, and for future systems as well. While performance and data integrity are very important, it is the unparalleled flexibility to integrate a wide variety of peripherals across several platforms that has made SCSI the system designer's choice. Since SCSI provides for logical rather than physical addressing, it allows the system software to be independent of the particular peripheral device on the host adapter. Device size and even type can be modified or added to the SCSI bus with virtually no change in the system. Expansion or upgrading of the I/O system is simplified with the SCSI bus because of the logical independence at the host. Since the host sees the same interface, the native drive interface is transparent to the system hardware and operation system, thus minimizing design time during expansion. The SCSI specification is officially defined by the American National Standards Institute (ANSI) document ANSI X3.131-1986. The standard was approved by the ANSI and is available to the public. SCSI specifications are also evolving to provide greater performance—the newest extension being SCSI-2. SCSI-2 features bus bandwidth increases to a 16- or 32-bit wide bus and increased data transfer rates to 10 Mbytes/sec, made possible by the latest SCSI chips and by tightening bus timing.

Figure 4:
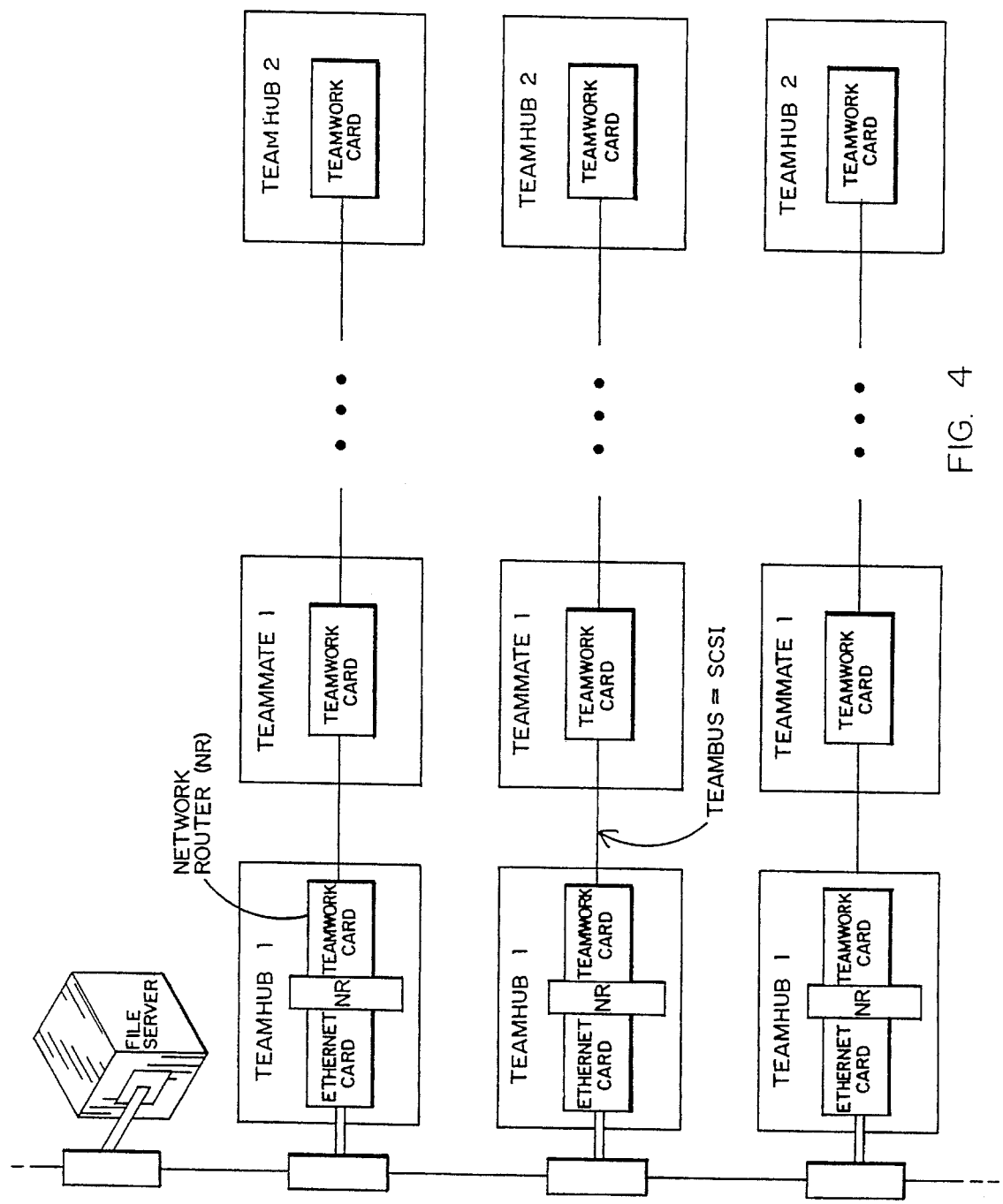
FIG. 4 is a block diagram of a network configuration of the present invention.

The present invention is also suitable for connection in a network configuration to permit more than eight users to operate simultaneously. Thus for example, a network configuration capable of supporting up to twenty-four users or more is shown in FIG. 4. More specifically, as shown in FIG. 4, a plurality of TEAMPRO systems, 40, 42 and 44 each having two TEAMHUBS and up to six TEAMMATES, are all connected to a common network interface link such as Ethernet or a wireless communication link or other network interface protocols to a file server 46, the latter operating in a conventional manner to control data communications between the respective TEAMPRO systems. Each of the TEAMPRO systems includes a TEAMHUB and a plurality of TEAMMATEs and each such TEAMMATE and each such TEAMHUB includes a TEAMWORK CARD or SCSI interface forming a daisy chain communication link between the TEAMMATEs and the TEAMHUB of each TEAMPRO system. In addition, each TEAMHUB is provided with an Ethernet card 48 to facilitate connection to a common network interface also connected to a file server, as previously described. Other network interface communications with which the present invention is capable of operating include wireless, EPP, FDDI, serial port and Token-Ring and the like. In such a network environment, the TEAMPRO system can be used as the basic network building block, instead of using a single PC, thus providing a better network architecture. TEAMPRO relieves the centralized file server from overloading, reduces unnecessary network traffic, enhances the network security to prevent unauthorized intruders from having direct access to the file server and boosts the network distributed TEAMWORK computing by providing 10 megabyte per second high transfer rates.

Figure 5:
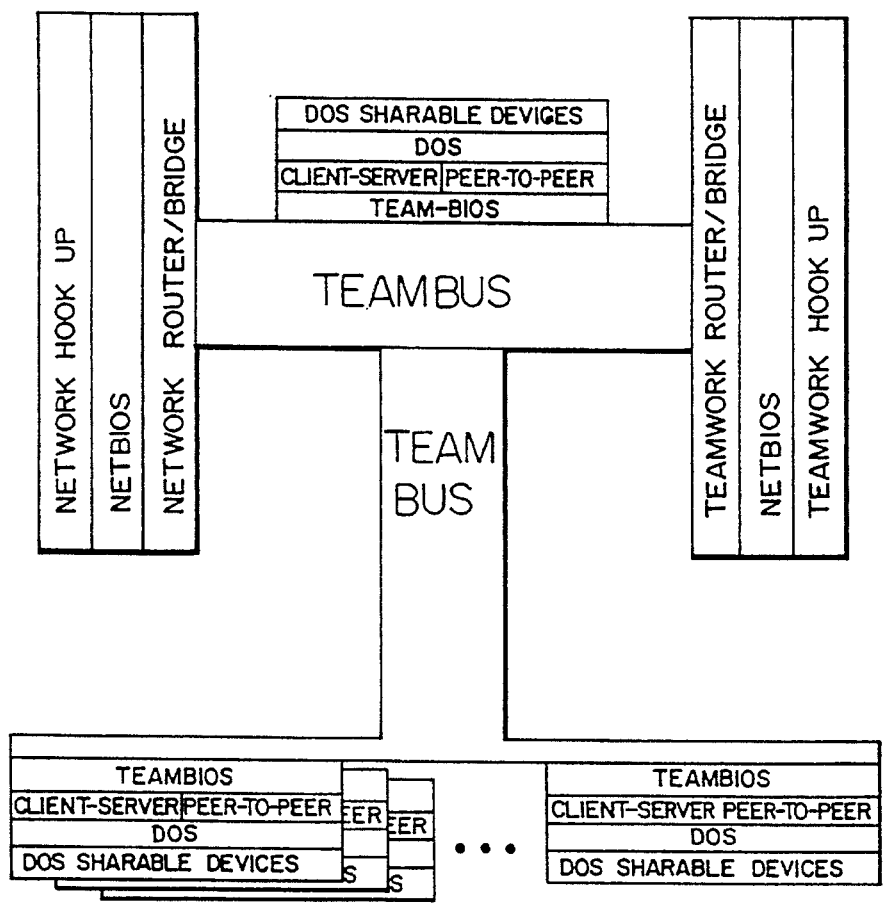
FIG. 5 is a topological block diagram illustrating the method of interchassis communication between computers of the present invention.
Figure 6:
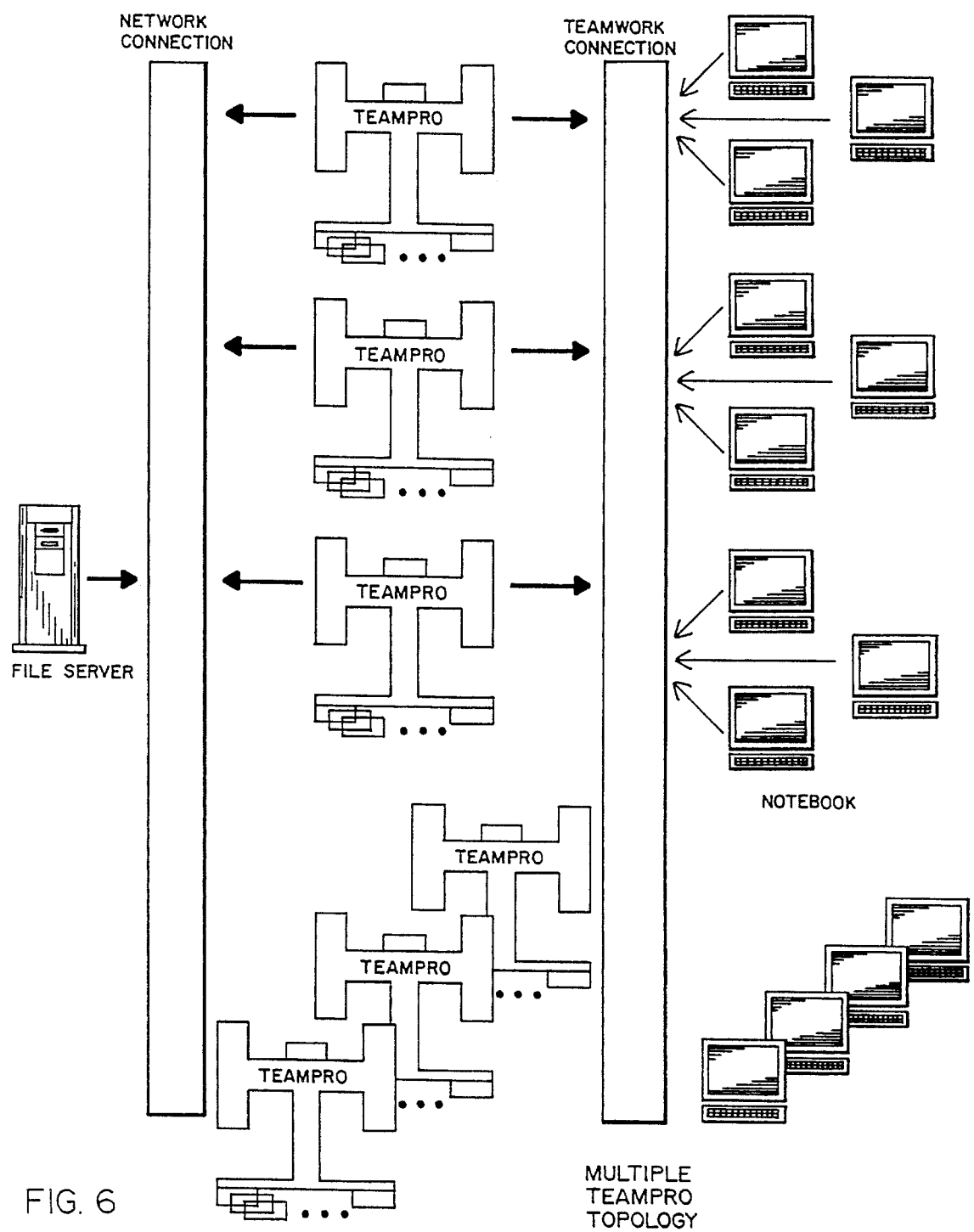
FIG. 6 is a topological block diagram illustrating network interconnection using the present invention.

As shown in FIG. 5, each TEAMPRO computer system of the present invention may be characterized as a hub system using the TEAr. US concept for connecting a hub computer to DOS sharable devices through a Teambios software interface and for connecting a number of TEAMMATE computers to DOS sharable devices in the same manner in a work group environment. Teambios is based upon well-known NETBIOS software. It incorporates a built-in LAN driver based on a 10M Bytes/second data transfer rate to run directly with any popular Peer-to-Peer network operating systems, enabling the invention to provide a teamwork environment with the fastest possible team/work group communications. As seen further in FIG. 5, the TEAMBUS of the present invention may interface with a network router/bridge and a teamwork router/bridge. Such a router/bridge provides software and hardware to convert from one network protocol to another to provide transparent communications capability. Such communications capability is depicted in FIG. 6 wherein a plurality of TEAMPRO systems of the present invention are shown connected by their respective network interfaces to a network connection serviced by a file server. Also seen in FIG. 6 is that the plurality of TEAMPRO systems are also connected by their respective teamwork interfaces to a plurality of notebook and laptop computers, for example, using a teamwork connection comprising Ethernet, Token-Ring, wireless or parallel port interface.

Figure 7:
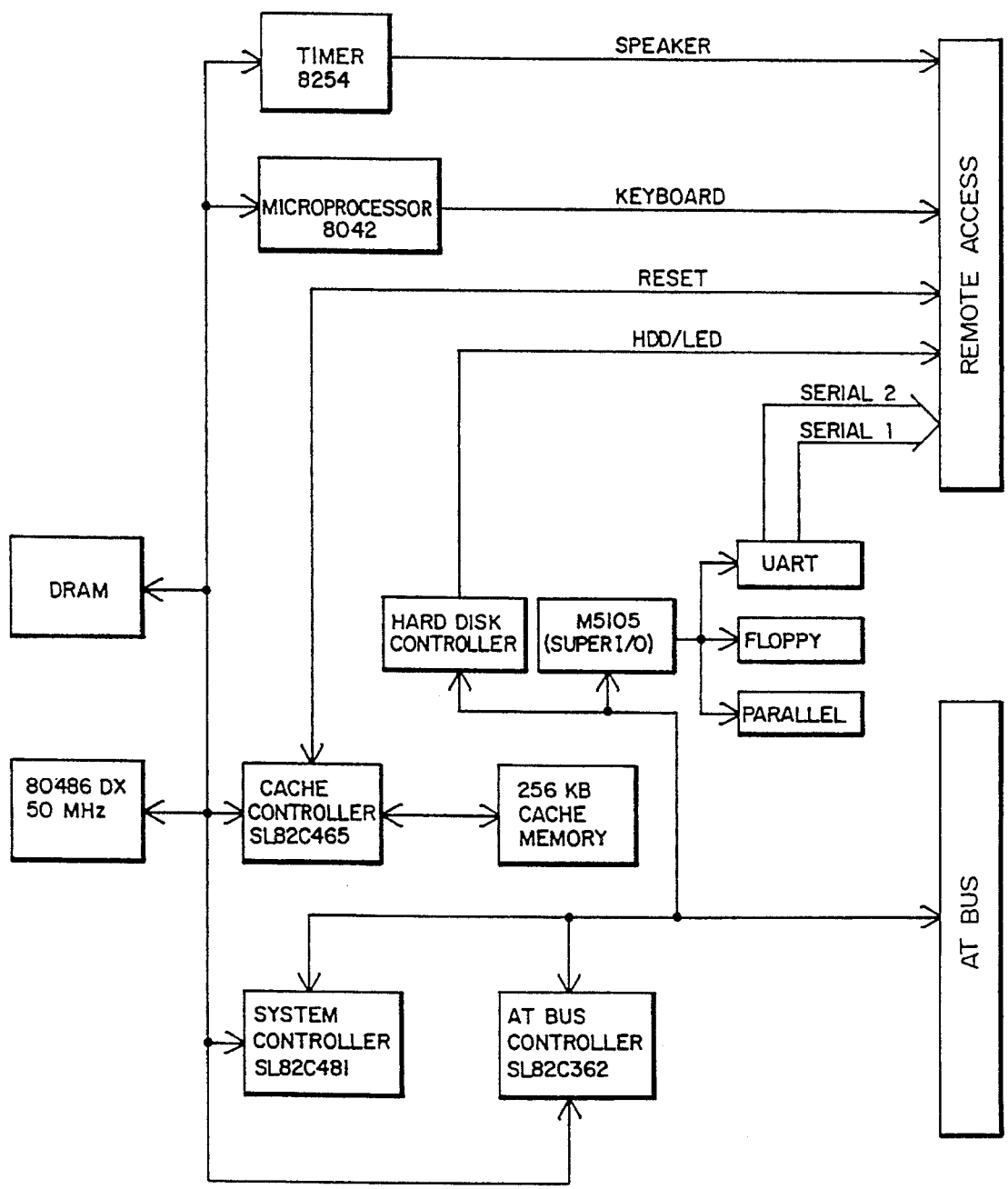
FIG. 7 is a schematic drawing of the CPU card of the present invention.

Referring now to FIG. 7, it will be seen that a CPU card of the present invention comprises a selected CPU chip, such as an 80486 DX 50 megahertz CPU chip with attendant cache memory of 256 kbytes and associated CPU and cache controller such as a Model SL82C465 and its associated random access memory of 16 megabytes. The CPU card of the present invention also comprises a system controller such as a Model SL82C461 and a bus controller such as a Model SL82C362 AT Bus Controller. All such SL model intergrated circuit devices are available from Symphony Laboratories, Inc. Furthermore, it will be seen in FIG. 6 that each CPU card includes a hard disk controller and an ACER Model M5105 Super Input/Output interface incorporating a universal asynchronous receiver/transmitter, a floppy disk controller and a parallel data port. AT bus protocol is described in Volume I of the Technical Reference of the IBM Personal Computer Hardware Reference Library, revised edition published in 1984.

Figure 8:
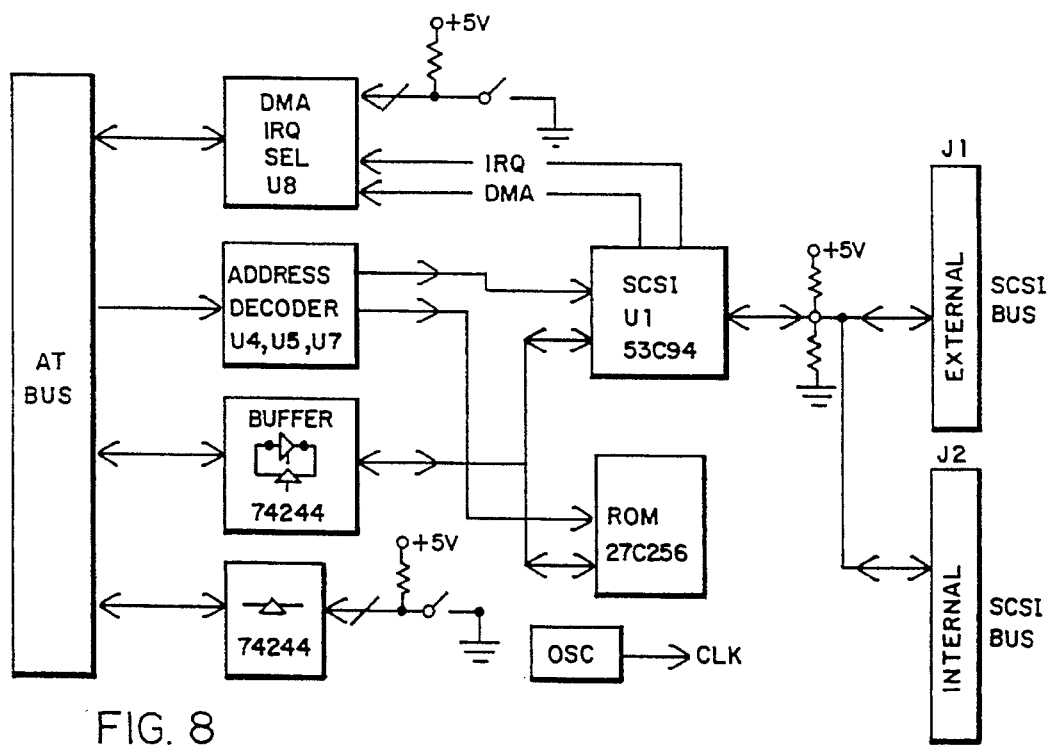
FIG. 8 is a schematic diagram of the SCSI card of the present invention.

Referring now to FIG. 8, it will be seen that a TEAMWORK CARD of the present invention comprises a Model 53C94 SCSI interface chip, a Model 27C256 read only memory, a direct memory access and interrupt request selection interface chip, a plurality of address decoders connected to the SCSI chip and the read only memory chip and a plurality of buffer interface units. The direct memory access and interrupt request selector, address decoders and buffers are all connected to the AT bus for interface with a CPU card. Each such SCSI chip may be obtained from EMULEX Corporation of Costa Mesa, Calif. The SCSI interface chip is connected to two SCSI bus interface connectors which provide the daisy chain connectors for the TEAMBUS interconnecting TEAMMATEs and TEAMHUB within the TEAMPRO chassis.

Figure 9:
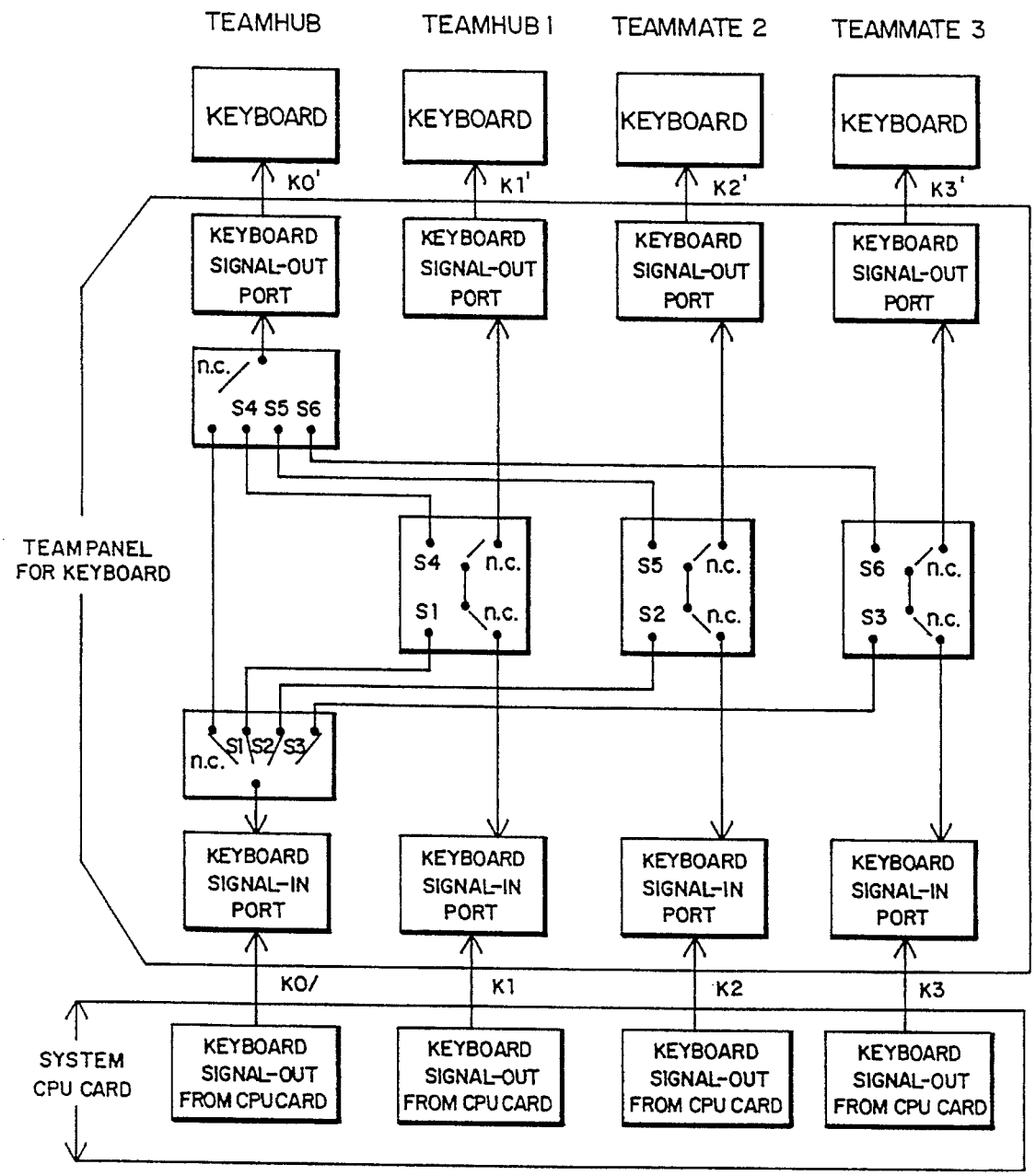
FIG. 9 is a schematic diagram of the teampanel of the present invention for keyboard switching.
Figure 10:
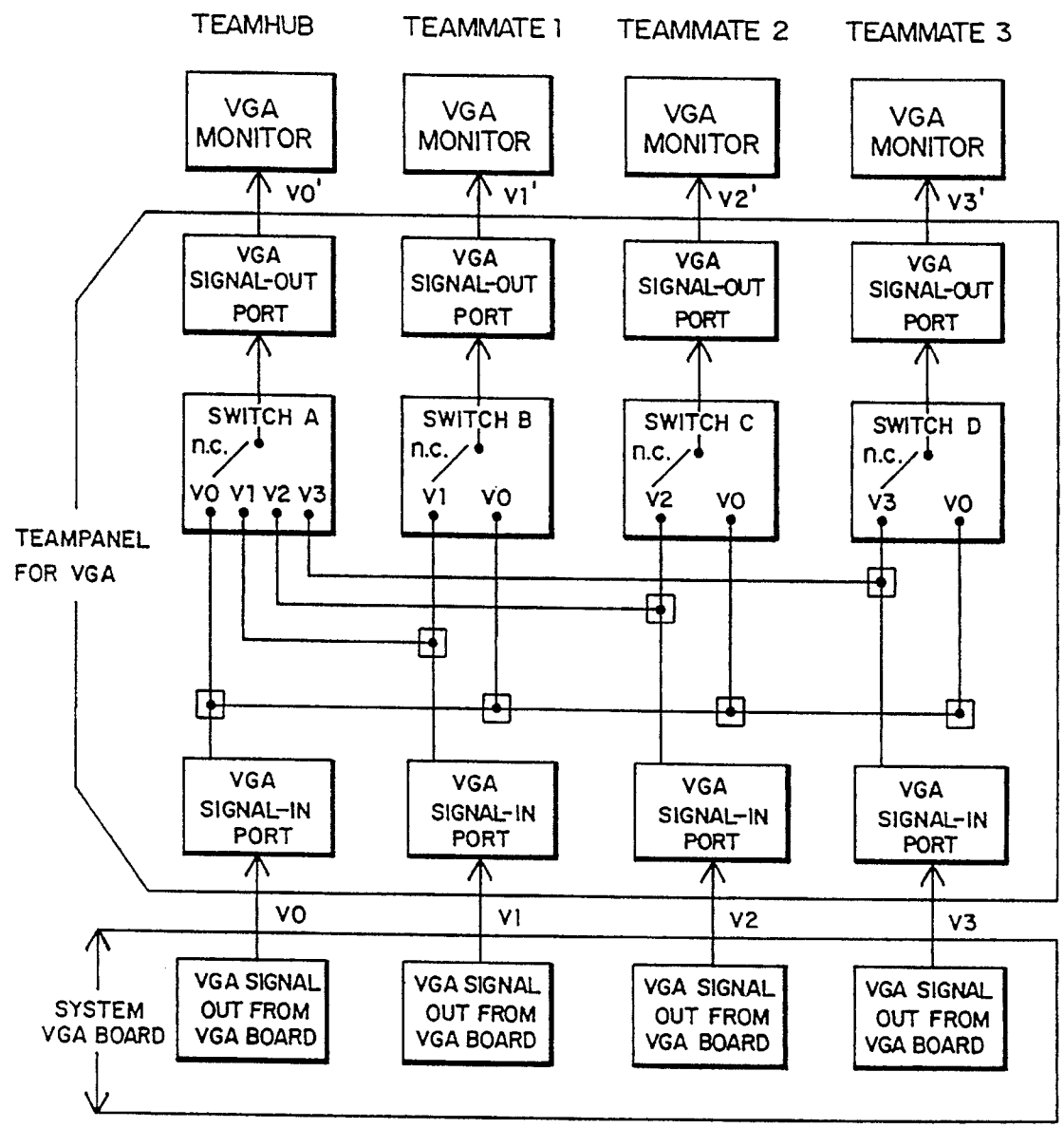
FIG. 10 is a schematic diagram of the teampanel of the present invention for monitor switching.

The VGA card of the present invention may be a standard, commercially available VGA card such as a Prisma VGART 1280I, which is commercially available from PRISMA Corporation and therefore need not be disclosed herein in any detail. This commercially available VGA card supports any advanced high performance VGA monitor and displays high resolution 1024X768 and 800X600 graphics in interlaced and non-interlaced modes and 1280X1024 graphics in interlaced mode. The TEAMPANELs of the present invention is shown in FIGS. 9 and 10. FIG. 9 illustrates the TEAMPANEL switching configuration for switching keyboard function of up to three TEAMMATES to the TEAMHUB keyboard and also for switching TEAMHUB keyboard signals to the TEAMMATE keyboard. As seen therein, when the switches of FIG. 9 are in their normal contact position, each of the TEAMMATEs and the TEAMHUB is connected to a corresponding individual keyboard. However, when switch S4, S5, or S6 is "ON", the TEAMHUB keyboard is connected to the keyboard signals of the CPU card corresponding to TEAMMATE 1, 2 or 3 instead of the keyboard signals from the CPU card on the TEAMHUB.

FIG. 10 illustrates the TEAMPANEL switching configuration for switching monitor functions of up to three TEAMMATEs to the TEAMHUB monitor and for also displaying TEAMHUB signals on the TEAMMATE monitors. As seen in FIG. 10, when switches A, B, C and D are in their normal contact position, each of the TEAMMATES and the TEAMHUB is connected to a corresponding individual monitor. However, switch A can be configured to connect any TEAMMATE to the TEAMHUB monitor and each of switches B, C and D can be configured to connect the TEAMHUB to any of the corresponding TEAMMATE monitors. Thus, the TEAMPANELs provide backup in the event of a failure of any TEAMMATE computer.

Figure 11:
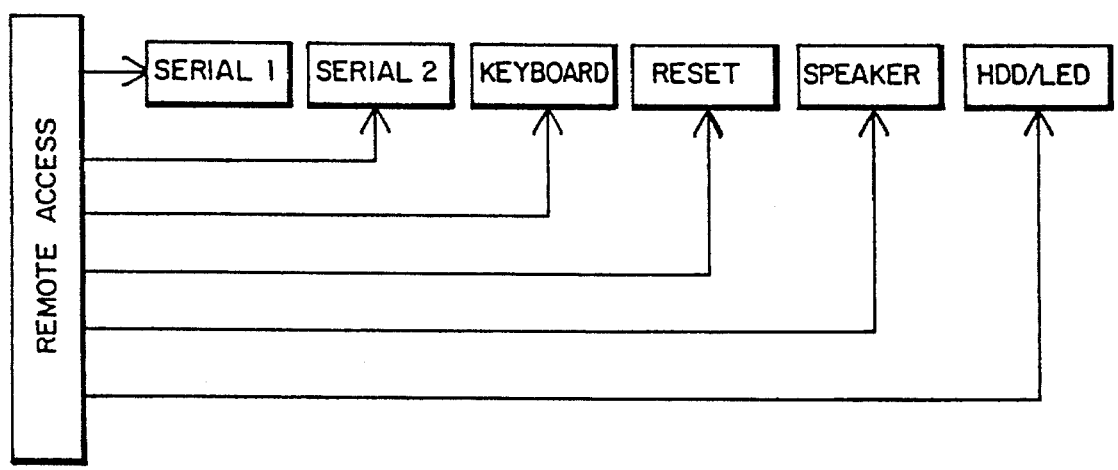
FIG. 11 is a block diagram of the keyboard of the present invention.

FIG. 11 illustrates the pin-out definition of the remote access port of the CPU card of FIG. 7. As seen in FIG. 11, there are two serial ports, a keyboard interface, reset line, speaker lines and HDD/LED, the latter providing a remote user with an indication of operating status. From FIG. 11, it will be seen that the keyboard of the present invention is unique in that it provides two serial ports, reset, speaker and HDD/LED signal transfer in addition to standard ASCI keyboard signals.

It will now be apparent that what has been described herein comprises a multiple computer system having team/work group features built in. In a preferred embodiment of the invention, a principal hardware component thereof is a unitary chassis of a compact tower configuration, designed to house electronics for up to four personal computers, all operating on a single power supply. The unitary chassis provides interconnecting cable for connecting up to four corresponding display terminals and keyboards. One of the personal computers in the chassis is designated the TEAMHUB and the remaining personal computers in the chassis are designated TEAMMATES. Up to three such additional computers called TEAMMATES may be included in one such chassis. Two TEAMPRO systems may be readily combined to serve up to eight local users in a team/work group environment. Each TEAMHUB and TEAMMATE computer in the preferred embodiment herein may utilize an Intel Model 386 or 486 based CPU system. Each such computer electronics within the TEAMCHASSIS provides a communication card, which may for example be a SCSI card providing data rate transfer between TEAMHUB and TEAMMATES at 10 Megabytes per second. Furthermore, within the TEAMCHASSIS, each computer comprises a CPU card and a monitor interface card, such as a VGA card. In addition, the chassis provides at least one 5¼ inch floppy disk drive and at least one 3½ inch floppy disk drive, both of which can be shared by any of the four computers in a daisy chain configuration. In addition, each computer has its own hard disk drives. The system is also designed to connect to external devices, such as a CD-ROM or other SCSI devices commonly known to those familiar with the SCSI interconnection standard. Each communication card of a SCSI configuration includes a LAN driver designed to run directly with a variety of popular DOS-based client-server and Peer-to-Peer network operating systems, such as Netware, Novell-Lite, Lantastic and the like. The overall multiple computer system of the present invention referred to herein as TEAMPRO can be configured to have only one computer to start with and gradually be increased in the number of computers up to eight with significant cost savings. Multiple TEAMPRO work group systems can also be easily linked by wireless or Ethernet and the like, producing the most ideal enterprise wide network. TEAMPRO can easily be hooked up with any existing personal computers by using a TEAMWORK card, including direct hook-up with SUN and DEC workstations. In an enterprise-wide network environment, TEAMPRO can serve as a network bridge for portables, such as laptop and notebook computers, thus creating a better network architecture to organize and manage network activities. When hooked up to an enterprise-wide network, the TEAMHUB or TEAMMATE computers instantly become a network node and expand the network connectivity effortlessly, without reconstructing the cumbersome existing network cabling. Thus, it will be seen that the present invention provides a PC-based local area network computer system in which a single chassis is used to house electronics for up to four personal computers. It will also be seen that the present invention provides a PC based TEAMWORK computer system for small areas, such as up to 20,000 square feet, wherein a plurality of users at different workstation locations, each has a monitor and keyboard connected to a central TEAMCHASSIS which houses the central processing unit for each of the computer workstations. Furthermore, it is seen that the present invention comprises a multiple PC-based work group computer system in which a TEAMWORK computer and a plurality of TEAMMATE computers are interconnected through TEAMPANELs to allow the TEAMHUB user to switch the monitor display and keyboard operations with any of the TEAMMATE computers into the TEAMHUB for backup or supervision and control, such as in an educational environment. It will also be understood now that the present invention provides an improved multi-computer, multi-level architecture having an increased data transfer rate communication, work group link to reduce unnecessary network traffic.

Those having skill in the art to which the present invention pertains, will now as a result of the applicants' teaching herein, perceive various modifications and additions which may be made to the invention. By way of example, the precise number of multiple computers housed in a unitary chassis of the present invention, as well as the manner in which circuit cards are provided to interconnect such computers, as well as to interconnect the keyboards and monitors thereof at dispersed stations relative to such computers, as well as the manner for interconnecting the multiple computer system of the present invention with a network or work group environment or both, may be readily altered from the exemplary preferred embodiment disclosed herein. Accordingly, all such modifications and additions which may be made to the invention are deemed to be within the scope of the claims appended hereto and their equivalents.

We claim:

1. A multiple computer system comprising:

a unitary chassis;

a plurality of CPU circuits, each such CPU circuit corresponding to a distinct computer having a remote access port;

a plurality of bus intercommunication circuits for data communications between said computers, each said bus intercommunication circuit corresponding to a distinct computer;

a plurality of display monitor control circuits for controlling display monitors, each such display monitor control circuit corresponding to a distinct computer;

said pluralities of CPU circuits, bus intercommunication circuits and display monitor control circuits being contained and electrically interconnected within said unitary chassis;

a single power supply within said chassis for powering all of said circuits;

a plurality of hard disk drives disposed within said chassis, each of said CPU circuits being coupled to at least a respective one of said plurality of hard disk drives;

at least one floppy disk drive disposed within said chassis and coupled to each of said plurality of CPU circuits for access by all of said CPU circuits;

each said computer having a display monitor and a keyboard externally positioned relative to said chassis and connected to corresponding computer circuits within said chassis by associated cables, each said keyboard being coupled to a respective one of said remote access ports of one of said distinct computers and including a pair of serial ports for coupling peripheral devices to said keyboard and an indicator to provide status of a respective hard disk drive; and switching means for switching to a selected one of said display monitors the signals being transmitted to any other of said display monitors.

2. The computer system recited in claim 1 wherein said switching means comprises a control panel and a housing external to said unitary chassis for placement thereof at a location remote from said chassis.

3. A multiple computer system comprising:

a unitary chassis;

a plurality of CPU circuits, each such CPU circuit corresponding to a distinct computer having a remote access port for transmitting and receiving signals;

a plurality of bus intercommunication circuits for data communications between said computers, each said bus intercommunication circuit corresponding to a distinct computer;

a plurality of display monitor control circuits for controlling display monitors, each such display monitor control circuit corresponding to a distinct computer;

said pluralities of CPU circuits, bus intercommunication circuits and display monitor control circuits being contained and electrically interconnected within said unitary chassis;

a single power supply within said chassis for powering all of said circuits;

a plurality of hard disk drives disposed within said chassis, each of said CPU circuits being coupled to at least a respective one of said plurality of hard disk drives;

at least one floppy disk drive disposed within said chassis and coupled to each of said plurality of CPU circuits for access by all of said CPU circuits;

each said computer having a display monitor and a keyboard externally positioned relative to said chassis and connected to corresponding computer circuits within said chassis by associated cables, each said keyboard being coupled to a respective one of said remote access ports of one of said distinct computers and including a pair of serial ports for coupling peripheral devices to said keyboard and an indicator to provide status of respective hard disk drive; and switching means for switching from a selected keyboard of one said computer the signals being transmitted between any other remote access port of said computers.

4. The computer system recited in claim 3 wherein said switching means comprises a control panel and a housing external to said unitary chassis for placement thereof at a location remote from said chassis.

* * * * *